(12) United States Patent
Flaman

(10) Patent No.: US 12,270,427 B2
(45) Date of Patent: Apr. 8, 2025

(54) ICE SCREW ASSEMBLY

(71) Applicant: Earl Flaman, Moosomin (CA)

(72) Inventor: Earl Flaman, Moosomin (CA)

( * ) Notice: Subject to any disclaimer, the term of this patent is extended or adjusted under 35 U.S.C. 154(b) by 287 days.

(21) Appl. No.: 17/965,052

(22) Filed: Oct. 13, 2022

(65) Prior Publication Data
US 2024/0125347 A1 Apr. 18, 2024

(51) Int. Cl.
*F16B 35/04* (2006.01)
*A63B 29/02* (2006.01)

(52) U.S. Cl.
CPC ............ *F16B 35/04* (2013.01); *A63B 29/025* (2013.01)

(58) Field of Classification Search
CPC ............................... A63B 29/027; F16B 35/04
USPC ........................................................ 284/231.9
See application file for complete search history.

(56) References Cited

U.S. PATENT DOCUMENTS

| | | | | |
|---|---|---|---|---|
| 3,352,193 A | | 11/1967 | Lerich | |
| 3,927,597 A | * | 12/1975 | Stults | ................. F16B 13/0808 411/341 |
| 3,940,941 A | | 3/1976 | Libert | |
| 4,233,881 A | * | 11/1980 | Carrier | .................... F16B 13/12 411/72 |
| 4,298,298 A | * | 11/1981 | Pontone | ................ F16B 13/002 411/409 |
| 4,595,315 A | * | 6/1986 | Gallagher, Jr. | ...... E21D 21/0026 405/259.5 |
| 4,721,306 A | | 1/1988 | Shewchuk | |
| 5,118,061 A | * | 6/1992 | Byrne | ................... A63B 29/027 248/231.9 |
| 5,180,264 A | | 1/1993 | Farwell | |
| 5,782,442 A | * | 7/1998 | Kwak | .................. A63B 29/025 248/231.9 |
| 6,068,226 A | * | 5/2000 | Anders | ................ A63B 29/025 248/231.91 |
| 8,888,415 B2 | | 11/2014 | Ikuno | |
| 8,894,329 B1 | * | 11/2014 | Kekahuna | ............. E04B 1/4157 405/259.4 |
| 9,303,456 B1 | * | 4/2016 | Fiorello | ............... A63B 29/025 |
| D927,968 S | | 8/2021 | Hudson | |
| 2010/0193660 A1 | * | 8/2010 | Colla | ..................... A01K 97/01 248/552 |
| 2011/0047919 A1 | * | 3/2011 | Hohmann, Jr. | ........ E04B 1/7616 52/699 |
| 2014/0260051 A1 | * | 9/2014 | Hohmann, Jr. | ........ E04B 1/4178 52/565 |
| 2019/0301505 A1 | * | 10/2019 | Tjerrild | ................. F16B 43/001 |

* cited by examiner

*Primary Examiner* — Gary W Estremsky

(57) ABSTRACT

An ice screw assembly includes a screw that has a head and a shaft. The shaft has a threaded portion and an unthreaded portion and the threaded portion penetrates ice for securing the screw into the ice. A first washer is secured around the screw and the first washer is positioned on the unthreaded portion of the shaft to abut the ice when the screw is threaded into the ice. A second washer is movably positioned around the screw and the second washer is positioned between the first washer and the head. The second washer has an opening extending through the second washer thereby facilitating an anchoring line of an ice shack to be attached to the second washer to secure the ice shack to the ice.

7 Claims, 7 Drawing Sheets

ICE SCREW ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to screw devices and more particularly pertains to a new screw device for anchoring an ice shack to ice. The device includes an ice screw and a nut attached to an end of the ice screw to facilitate the nut to be engaged by a socket on a power drill to screw the ice screw into ice. The device includes a first washer fixed to the ice screw that is spaced from the head which abuts the ice and a second washer positioned around the screw that is positioned between the first washer and the second washer. The second washer has a hole through which an anchor line of an ice shack can be attached to secure the ice shack to the ice.

(2) Description of Related Art Including Information Disclosed Under 37 CFR 1.97 and 1.98

The prior art relates to screw devices including a variety of anchor bolts that each at least includes a threaded shaft, a nut that threadably engages the threaded shaft and a sleeve that expands when the nut is tightened. The prior art discloses a rock bolt that includes a bolt and a capsule of cement that is pierced by the bolt for securing the bolt in a rock. The prior art discloses an ornamental design for a screw anchor that includes a shaft, a helical coil wrapping around the shaft and a head attached to the shaft.

BRIEF SUMMARY OF THE INVENTION

An embodiment of the disclosure meets the needs presented above by generally comprising a screw that has a head and a shaft. The shaft has a threaded portion and an unthreaded portion and the threaded portion penetrates ice for securing the screw into the ice. A first washer is secured around the screw and the first washer is positioned on the unthreaded portion of the shaft to abut the ice when the screw is threaded into the ice. A second washer is movably positioned around the screw and the second washer is positioned between the first washer and the head. The second washer has an opening extending through the second washer thereby facilitating an anchoring line of an ice shack to be attached to the second washer to secure the ice shack to the ice.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
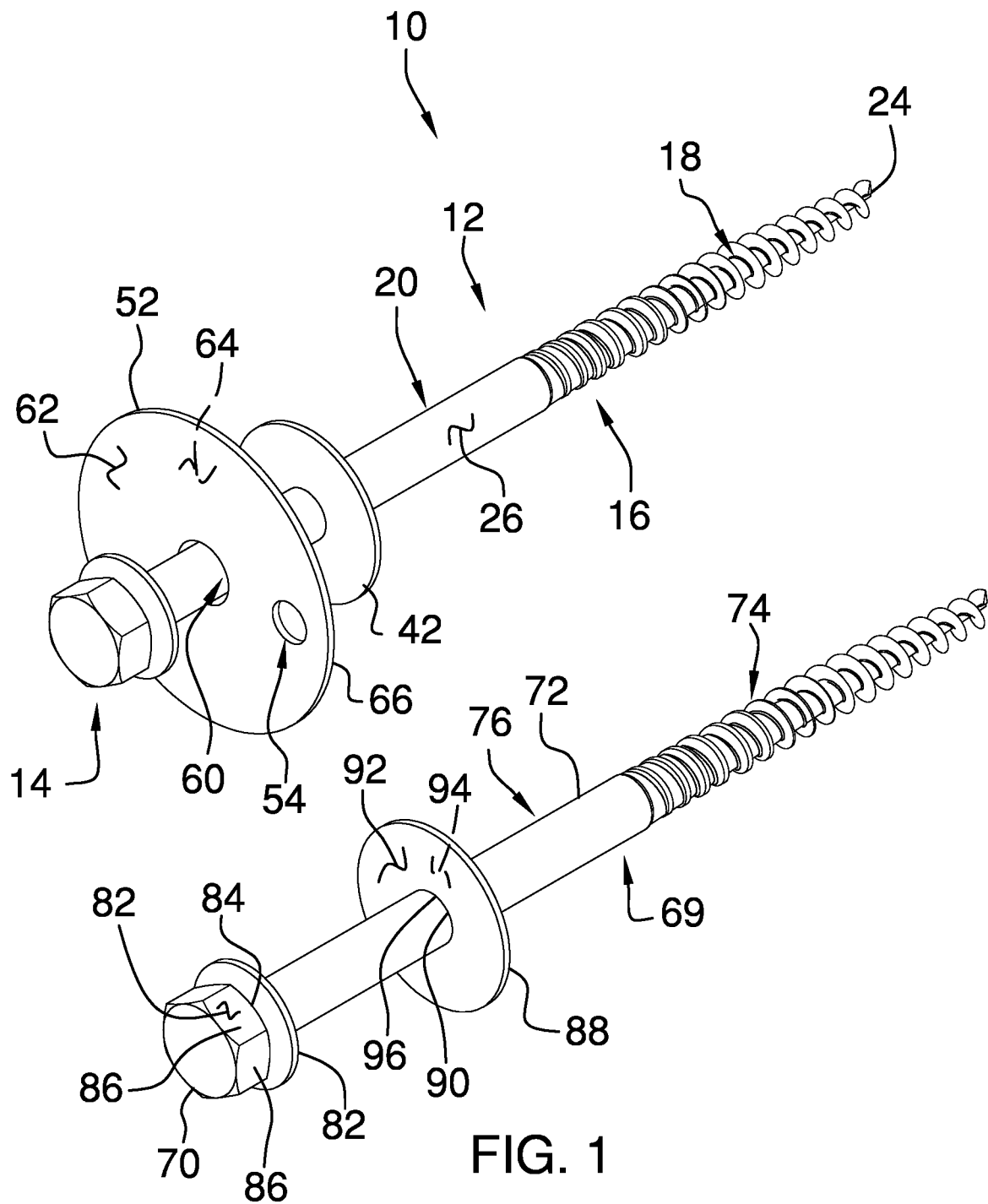
FIG. 1 is a perspective view of an ice screw assembly according to an embodiment of the disclosure.
Figure 2:
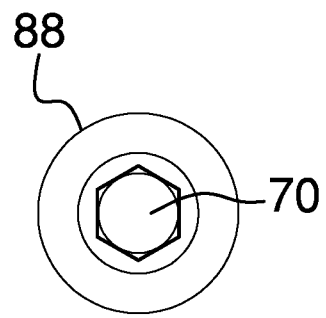
FIG. 2 is a top view of an embodiment of the disclosure.
Figure 3:
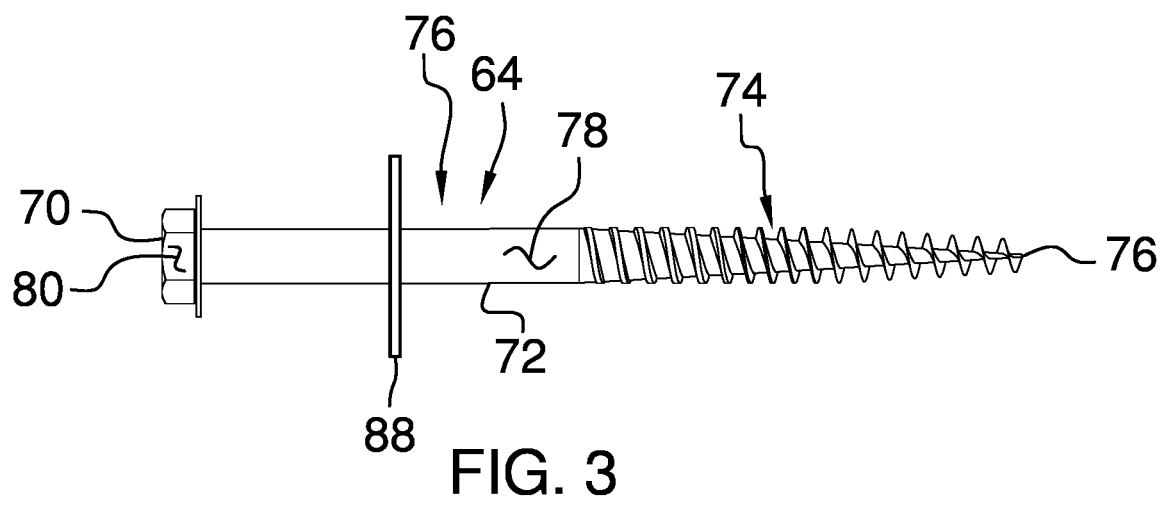
FIG. 3 is a front view of an embodiment of the disclosure.
Figure 4:
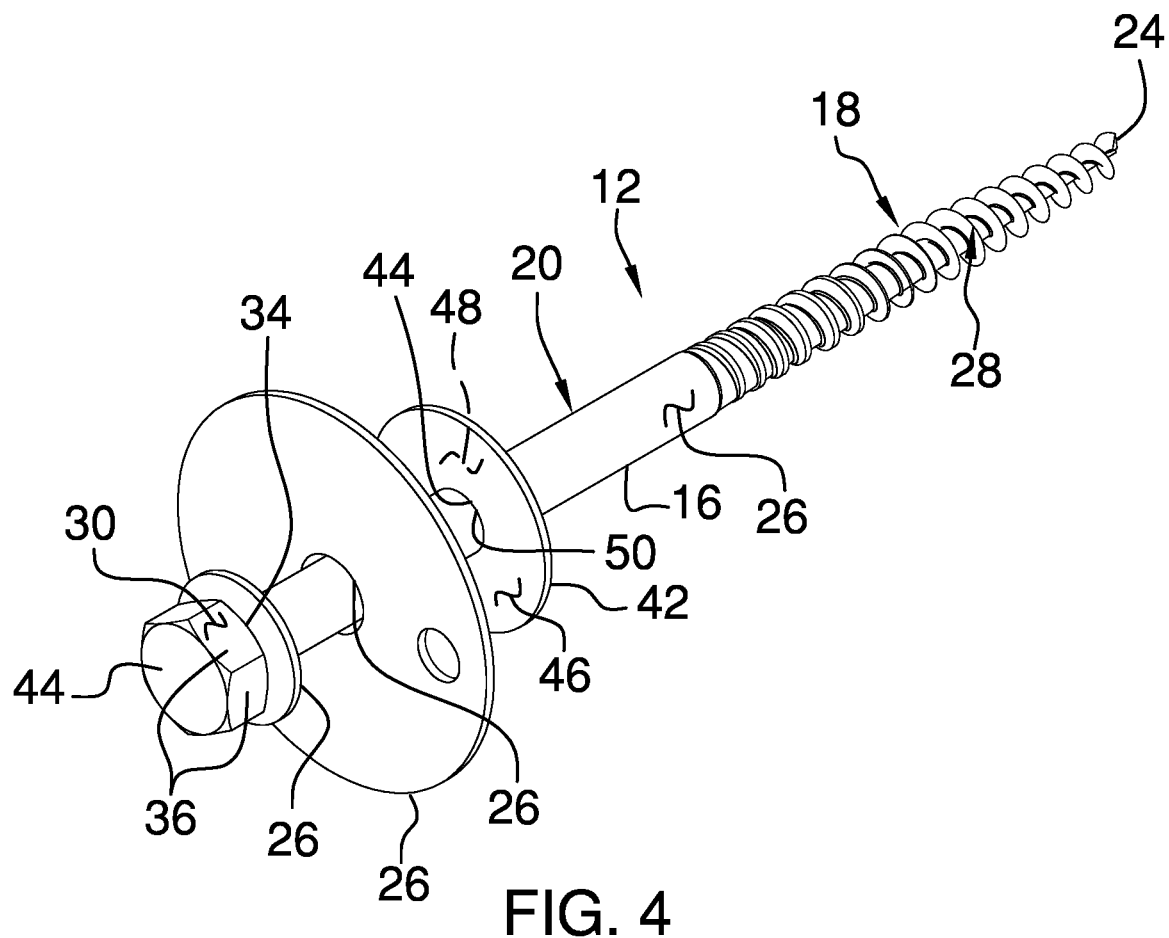
FIG. 4 is a top perspective view of an embodiment of the disclosure.
Figure 5:
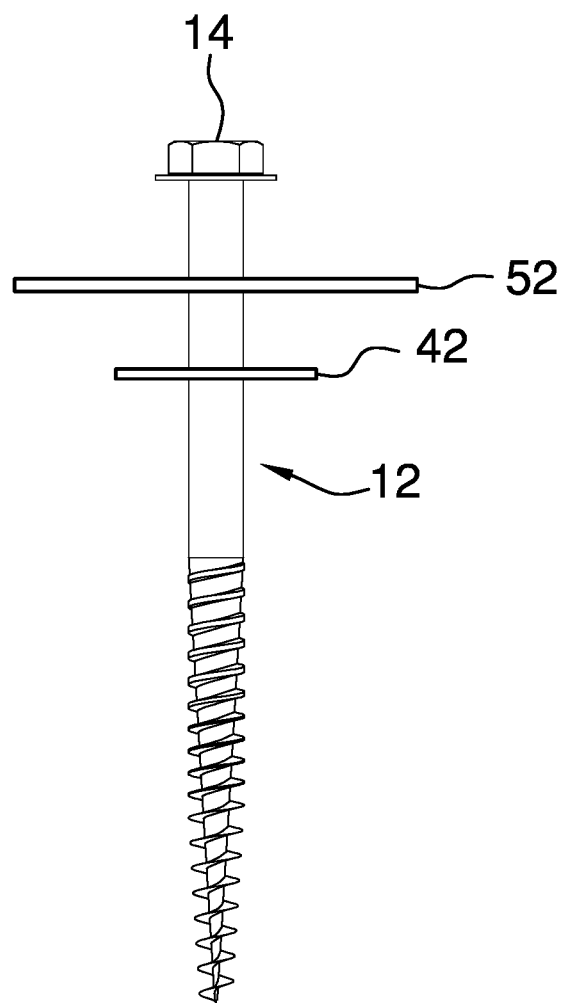
FIG. 5 is a front view of an embodiment of the disclosure.
Figure 6:
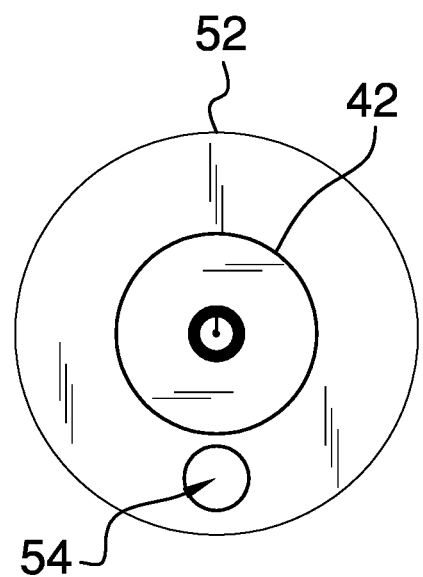
FIG. 6 is a top view of an embodiment of the disclosure.
Figure 7:
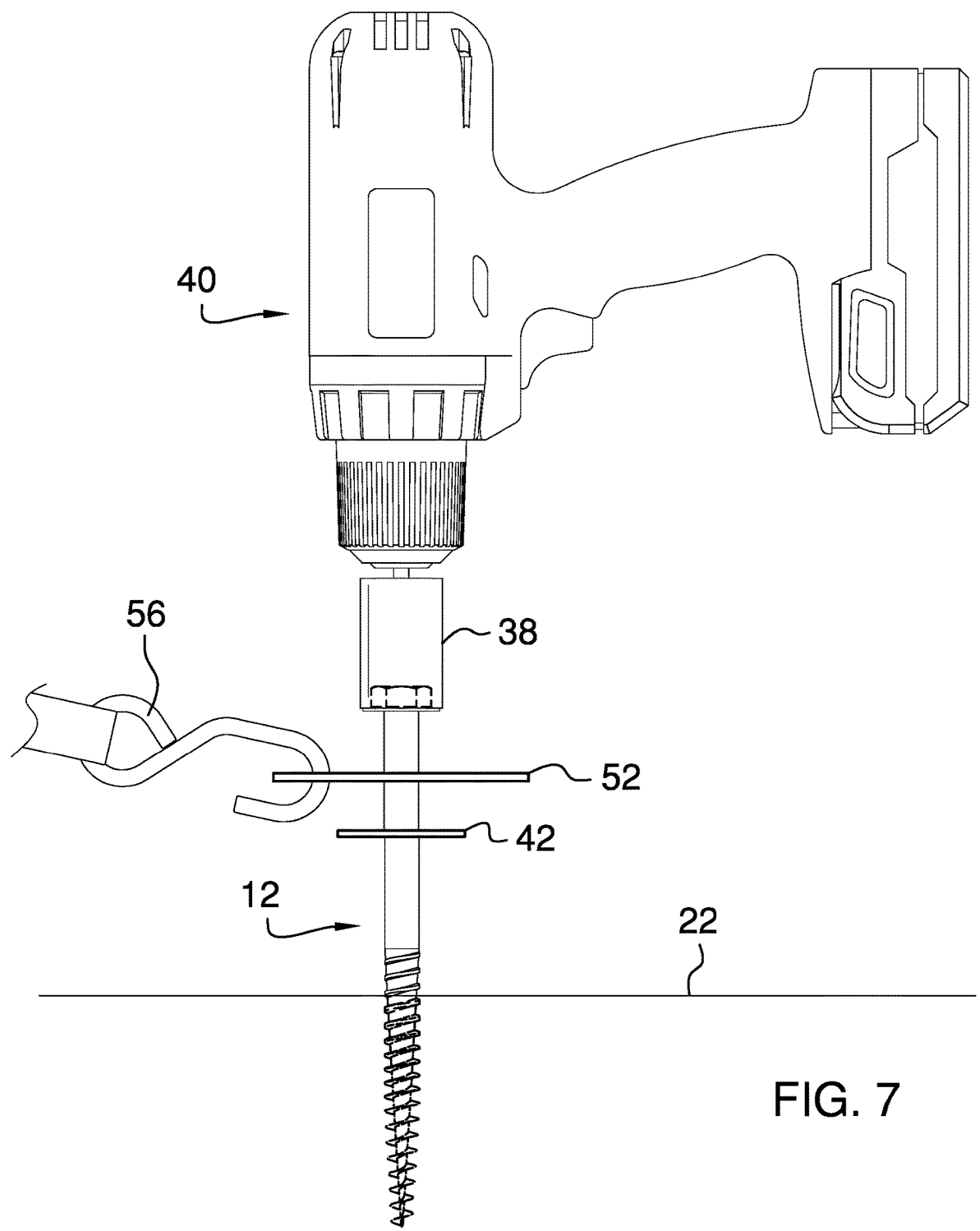
FIG. 7 is a perspective in-use view of an embodiment of the disclosure showing a first screw being threaded into ice.
Figure 8:
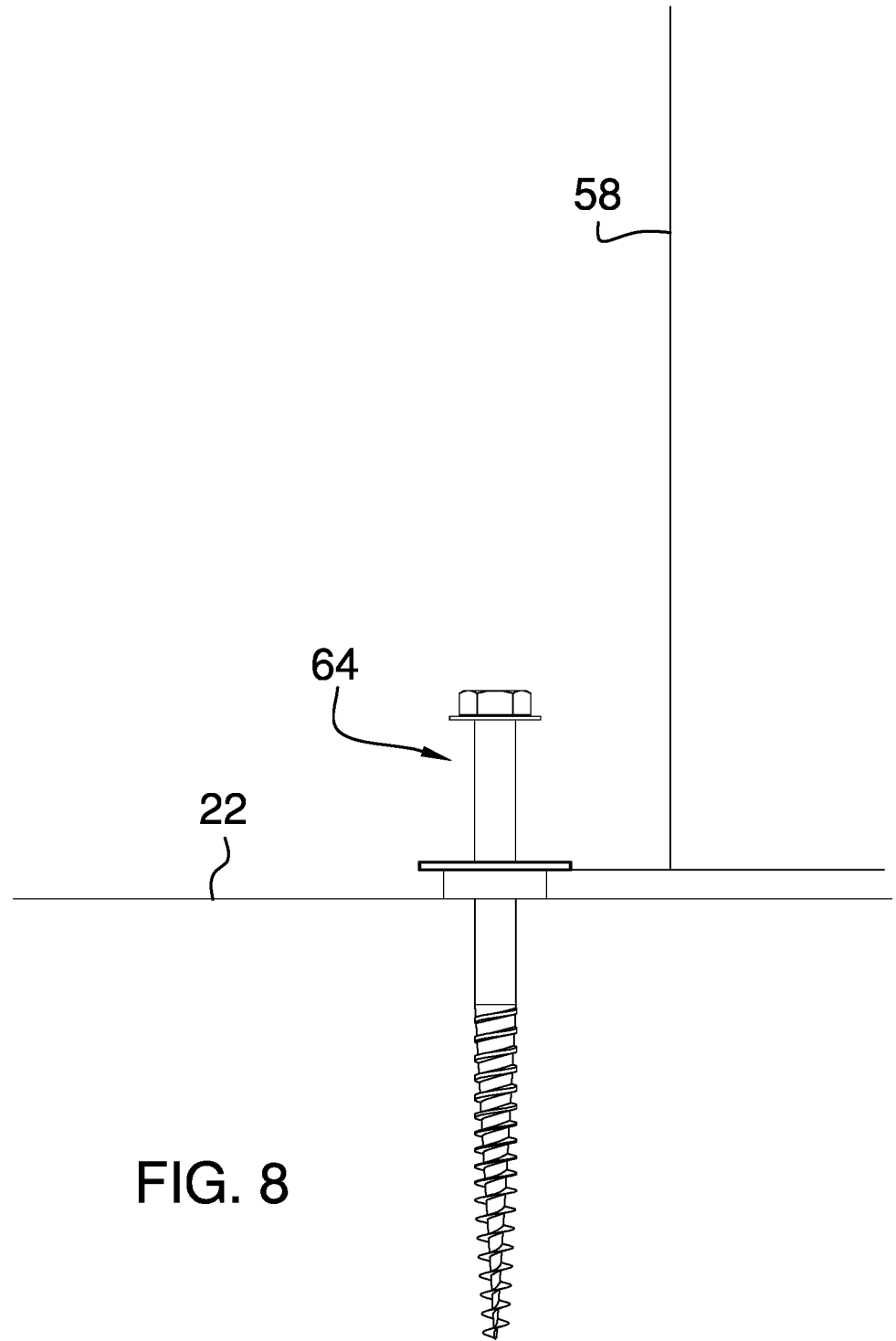
FIG. 8 is a perspective in-use view of an embodiment of the disclosure showing a second screw being threaded into ice.

With reference now to the drawings, and in particular to FIGS. 1 through 8 thereof, a new screw device embodying the principles and concepts of an embodiment of the disclosure and generally designated by the reference numeral 10 will be described.

As best illustrated in FIGS. 1 through 8, the ice first screw assembly 10 generally comprises a first screw 12 that has a head 14 and a shaft 16. The shaft 16 has a threaded portion 18 and an unthreaded portion 20 and the threaded portion 18 can penetrate ice 22 for securing the first screw 12 into the ice 22. The ice 22 may be ice on a frozen body of water such as a lake for example. The shaft 16 has a distal end 24 with respect to the head 14 and an outer surface 26 and the threaded portion 18 extends from the distal end 24 toward the head 14. The threaded portion 18 tapers to a point at the distal end 24. The unthreaded portion 20 extends between the threaded portion 18 and the head 14. The shaft 16 may be an ice first screw of any conventional design that is commonly employed in ice fishing for securing ice shacks to the ice 22. Additionally, the head 14 may be a hex nut that is welded to the ice first screw to facilitate the ice first screw to be driven with a wrench. The threaded portion 18 includes a helical coil 28 wrapping around the threaded portion 18 of the shaft 16. The helical coil 28 decreases in depth between the distal end 24 of the shaft 16 and a threshold between the threaded portion 18 and the unthreaded portion 20.

The head 14 has an outer surface 30 and flange 32 positioned on a bottom surface 34 of the head 14. The shaft 16 is attached to the flange 32 and the shaft 16 is centrally positioned on the flange 32. Furthermore, the flange 32 has a diameter that is greater than a diameter defined by the outer surface 30 of the head 14. The outer surface 30 of the head 14 has a plurality of intersecting sides 36 thereby facilitating the head 14 to be engaged by a socket 38 on a power drill 40 thereby facilitating the first screw 12 to be threaded into the ice 22.

A first washer 42 is secured around the first screw 12 and the first washer 42 is positioned on the unthreaded portion 20 of the shaft 16. In this way the first washer 42 abuts the ice 22 when the first screw 12 is threaded into the ice 22. The first washer 42 has a hole 44 extending through a top surface 46 and a bottom surface 48 of the first washer 42 and the hole 44 is centrally positioned on the first washer 42. The hole 44 has a bounding edge 50 and the shaft 16 extends through the hole 44 having the bounding edge 50 being bonded to the outer surface 26 of the shaft 16 corresponding to the unthreaded portion 20 of the shaft 16.

A second washer 52 is movably positioned around the first screw 12 and the second washer 52 is positioned between the first washer 42 and the head 14. The second washer 52 has an opening 54 extending through the second washer 52 thereby facilitating an anchoring line 56 of an ice shack 58 to be attached to the second washer 52. In this way the first screw 12 can secure the ice shack 58 to the ice 22. The second washer 52 has a hole 60 extending through an upper surface 62 and a lower surface 64 of the second washer 52 and the hole 60 in the second washer 52 is centrally positioned on the second washer 52. The unthreaded portion 20 of the outer surface 26 of the shaft 16 extends through the hole 60 in the second washer 52. The opening 54 extends through the upper surface 62 and the lower surface 64 and the opening 54 is positioned between the hole 60 in the second washer 52 and a perimeter edge 66 of the second washer 52. Additionally, the second washer 52 has a diameter that is greater than a diameter of the first washer 42.

A second screw 69 is included that has a head 70 and a shaft 72. The shaft 72 has a threaded portion 74 and an unthreaded portion 74 and the threaded portion 74 can penetrate ice 22 for securing the second screw 69 into the ice 22. The ice 22 may be ice on a frozen body of water such as a lake for example. The shaft 72 has a distal end 76 with respect to the head 70 and an outer surface 78 and the threaded portion 74 extends from the distal end 76 toward the head 70. The threaded portion 74 tapers to a point at the distal end 76. The unthreaded portion 74 extends between the threaded portion 74 and the head 70. The shaft 72 may be an ice second screw of any conventional design that is commonly employed in ice fishing for securing ice shacks to the ice 22. Additionally, the head 70 may be a hex nut that is welded to the ice second screw to facilitate the ice second screw to be driven with a wrench. The threaded portion 74 includes a helical coil 79 wrapping around the threaded portion 74 of the shaft 72. The helical coil 79 decreases in depth between the distal end 76 of the shaft 72 and a threshold between the threaded portion 74 and the unthreaded portion 74.

The head 70 has an outer surface 80 and flange 82 positioned on a bottom surface 84 of the head 70. The shaft 72 is attached to the flange 82 and the shaft 72 is centrally positioned on the flange 82. Furthermore, the flange 82 has a diameter that is greater than a diameter defined by the outer surface 80 of the head 70. The outer surface 80 of the head 70 has a plurality of intersecting sides 86 thereby facilitating the head 70 to be engaged by the socket 38 on a power drill 40 thereby facilitating the second screw 69 to be threaded into the ice 22.

A third washer 88 is secured around the second screw 69 and the third washer 88 is positioned on the unthreaded portion 74 of the shaft 72. In this way the third washer 88 abuts the ice 22 when the second screw 69 is threaded into the ice 22. The third washer 88 has a hole 90 extending through a top surface 92 and a bottom surface 94 of the third washer 88 and the hole 90 in the third washer 88 is centrally positioned on the third washer 88. The hole 90 in the third washer 88 has a bounding edge 96 and the shaft 72 of the second screw 69 extends through the hole 90 in the third washer 88 having the bounding edge 96 of the third washer 88 being bonded to the outer surface 78 of the shaft 72 of the second screw 69 corresponding to the unthreaded portion 74 of the shaft 72 of the second screw 69.

In use, the first screw 12 is threaded into the ice 22 using a cordless drill, a socket wrench or other tool that can thread the first screw 12 into the ice 22. The first screw 12 is first screwed into the ice 22 until the first washer 42 abuts the ice 22. In this way the head 14 and the second washer 52 are spaced above the ice 22 when the first screw 12 is fully seated into the ice 22. As is most clearly shown in FIG. 7, a hook 68 on the anchoring line 56 is extended through the opening 54 in the second washer 52 to facilitate the first screw 12 to secure the ice shack 58 to the ice 22. The second screw 69 is extended through a grommet 98 on a lip 100 of the ice shack 58 and the second screw 69 is threaded into the ice 22 until the third washer 88 is compressed against the lip 100 thereby securing the ice shack 58 to the ice 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ice screw assembly for securing an ice shack to a frozen body of water, said assembly comprising:
   a screw having a head and a shaft, said shaft having a threaded portion and an unthreaded portion wherein said threaded portion is configured to penetrate ice for securing said screw into the ice, said threaded portion of said shaft having a core and threads extending from said core, said core tapering extending away from said unthreaded portion, a distance said threads extend from said core increasing as said threads extend away from said unthreaded portion towards a medial section of said core;

a first washer being secured around said screw, said first washer being positioned on said unthreaded portion of said shaft wherein said first washer is configured to abut the ice when said screw is threaded into the ice; and a second washer being movably positioned around said screw, said second washer being positioned between said first washer and said head, said second washer having an opening extending through said second washer thereby facilitating an anchoring line of an ice shack to be attached to said second washer wherein said screw is configured to secure the ice shack to the ice.

2. The assembly according to claim 1, wherein:

said shaft has a distal end with respect to said head and an outer surface, said threaded portion extending from said distal end toward said head, said unthreaded portion extending between said threaded portion and said head, said threaded portion tapering to a point at said distal end;

said head has an outer surface and flange positioned on a bottom surface of said head, said shaft being attached to said flange, said shaft being centrally positioned on said flange, said flange having a diameter being greater than a diameter defined by said outer surface of said head; and said outer surface of said head has a plurality of intersecting sides thereby facilitating said head to be engaged by a socket on a power drill thereby facilitating said screw to be threaded into the ice.

3. The assembly according to claim 2, wherein said first washer has a hole extending through a top surface and a bottom surface of said first washer, said hole being centrally positioned on said first washer, said hole having a bounding edge, shaft extending through said hole having said bounding edge being bonded to said outer surface of said shaft corresponding to said unthreaded portion of said shaft.

4. The assembly according to claim 2, wherein said second washer has a hole extending through an upper surface and a lower surface of said second washer, said hole in said second washer being centrally positioned on said second washer, said unthreaded portion of said outer surface of said shaft extending through said hole in said second washer.

5. The assembly according to claim 4, wherein said opening extending through said upper surface and said lower surface, said opening is positioned between said hole in said second washer and a perimeter edge of said second washer.

6. The assembly according to claim 1, wherein said second washer has a diameter being greater than a diameter of said first washer.

7. An ice screw assembly for securing an ice shack to a frozen body of water, said assembly comprising:

a screw having a head and a shaft, said shaft having a threaded portion and an unthreaded portion wherein said threaded portion is configured to penetrate ice for securing said screw into the ice, said shaft having a distal end with respect to said head and an outer surface, said threaded portion extending from said distal end toward said head, said unthreaded portion extending between said threaded portion and said head, said threaded portion of said shaft having a core and threads extending from said core, said core tapering extending away from said unthreaded portion, a distance said threads extend from said core increasing as said threads extend away from said unthreaded portion towards a medial section of said core, said threaded portion tapering to a point at said distal end, said head having an outer surface and flange positioned on a bottom surface of said head, said shaft being attached to said flange, said shaft being centrally positioned on said flange, said flange having a diameter being greater than a diameter defined by said outer surface of said head, said outer surface of said head having a plurality of intersecting sides thereby facilitating said head to be engaged by a socket on a power drill thereby facilitating said screw to be threaded into the ice;

a first washer being secured around said screw, said first washer being positioned on said unthreaded portion of said shaft wherein said first washer is configured to abut the ice when said screw is threaded into the ice, said first washer having a hole extending through a top surface and a bottom surface of said first washer, said hole being centrally positioned on said first washer, said hole having a bounding edge, shaft extending through said hole having said bounding edge being bonded to said outer surface of said shaft corresponding to said unthreaded portion of said shaft; and a second washer being movably positioned around said screw, said second washer being positioned between said first washer and said head, said second washer having an opening extending through said second washer thereby facilitating an anchoring line of an ice shack to be attached to said second washer wherein said screw is configured to secure the ice shack to the ice, said second washer having a hole extending through an upper surface and a lower surface of said second washer, said hole in said second washer being centrally positioned on said second washer, said unthreaded portion of said outer surface of said shaft extending through said hole in said second washer, said opening extending through said upper surface and said lower surface, said opening being positioned between said hole in said second washer and a perimeter edge of said second washer, said second washer having a diameter being greater than a diameter of said first washer.

\* \* \* \* \*